United States Patent
Toda et al.

(10) Patent No.: US 12,204,927 B2
(45) Date of Patent: Jan. 21, 2025

(54) SOFTWARE UPDATING APPARATUS, SOFTWARE UPDATING METHOD, AND PROGRAM

(71) Applicant: Nippon Telegraph and Telephone Corporation, Tokyo (JP)

(72) Inventors: Takato Toda, Musashino (JP); Nobuhiro Kimura, Musashino (JP); Kotaro Mihara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 428 days.

(21) Appl. No.: 17/632,301

(22) PCT Filed: Aug. 7, 2019

(86) PCT No.: PCT/JP2019/031125
§ 371 (c)(1),
(2) Date: Feb. 2, 2022

(87) PCT Pub. No.: WO2021/024417
PCT Pub. Date: Feb. 11, 2021

(65) Prior Publication Data
US 2022/0276890 A1 Sep. 1, 2022

(51) Int. Cl.
*G06F 9/455* (2018.01)
*G06F 8/60* (2018.01)
(Continued)

(52) U.S. Cl.
CPC ............ *G06F 9/45558* (2013.01); *G06F 8/60* (2013.01); *G06F 8/61* (2013.01); *G06F 8/63* (2013.01);
(Continued)

(58) Field of Classification Search
CPC ................ G06F 9/455; G06F 9/45558; G06F 2009/45562; G06F 2009/45575;
(Continued)

(56) References Cited

U.S. PATENT DOCUMENTS

2010/0332637 A1* 12/2010 Doi ......................... H04L 43/00
718/1
2013/0047147 A1* 2/2013 McNeill .............. G06F 9/45533
717/173

(Continued)

OTHER PUBLICATIONS

[No Author Listed] [online], "Network Virtualization (NFV)—Advantages of Network Virtualization—Part 2," NTT Docomo, Inc., retrieved on Jul. 12, 2019, retrieved from URL <https://www.nttdocomo.co.jp/corporate/technology/rd/lecture/nfv/>, 7 pages (with English Translation).

(Continued)

*Primary Examiner* — Charles M Swift
(74) *Attorney, Agent, or Firm* — Fish & Richardson P.C.

(57) ABSTRACT

In an updating method according to the present embodiment, a virtual machine (50-1A) is stopped, a virtual machine (50-1B) is started up using a new VM image (30-1B) to which a link to a database (20-1) is set, and the virtual machine (50-1B) is switched to an active system. A virtual machine (50-0A) is stopped and a virtual machine (50-0B) is started up using a new VM image (30-0B) to which a link to a database (20-0) is set.

4 Claims, 12 Drawing Sheets

(51) Int. Cl.
  *G06F 8/61* (2018.01)
  *G06F 8/65* (2018.01)
  *G06F 8/656* (2018.01)
(52) U.S. Cl.
  CPC ............... *G06F 8/65* (2013.01); *G06F 8/656* (2018.02); *G06F 9/455* (2013.01); *G06F 2009/45562* (2013.01); *G06F 2009/45575* (2013.01)
(58) Field of Classification Search
  CPC ..... G06F 8/60; G06F 8/61; G06F 8/63; G06F 8/65; G06F 8/656
  See application file for complete search history.

(56) References Cited

U.S. PATENT DOCUMENTS

| | | | | |
|---|---|---|---|---|
| 2013/0191340 A1* | 7/2013 | Ammanur | ........... | G06F 11/2038 707/638 |
| 2013/0254765 A1* | 9/2013 | Shinohara | ................ | G06F 8/65 718/1 |
| 2014/0130032 A1* | 5/2014 | Lipinski | .................... | G06F 8/65 717/171 |
| 2018/0084084 A1* | 3/2018 | Sharma | ................. | H04L 41/082 |
| 2019/0095187 A1* | 3/2019 | Benedek | ............ | G06F 9/44521 |

OTHER PUBLICATIONS

Kawaguchi et al., "Evaluation on Application of Virtualization Technology to SIP Server," IEICE Technical Report, 2017, 117(131):1-6, 13 pages (with English Translation).

Wei et al., "A study on partial backup and restore method in virtualized environment," 2019 IEICE General Conference, Mar. 19, 2019, 3 pages (with English Translation).

* cited by examiner

SOFTWARE UPDATING APPARATUS, SOFTWARE UPDATING METHOD, AND PROGRAM

CROSS-REFERENCE TO RELATED APPLICATIONS

This application is a National Stage application under 35 U.S.C. § 371 of International Application No. PCT/JP2019/031125, having an International Filing Date of Aug. 7, 2019, the disclosure of which is considered part of the disclosure of this application, and is incorporated in its entirety into this application.

TECHNICAL FIELD

The present invention relates to an updating apparatus, an updating method, and a program.

BACKGROUND ART

With recent advancements in virtualization technology, proposals have been made to run, on general-purpose hardware using virtualization technology, network devices that have conventionally been run using dedicated hardware. For example, an application of virtualization technology to an SIP server is considered in NPL 1.

A network device may adopt an active/standby configuration (ACT-SBY configuration) for the purpose of improving reliability. When a failure occurs in ACT (also referred to as an active system or an operating system), service can be continuously provided by switching to SBY (also referred to as a reserve system or a standby system). Even when a network device is virtualized, reliability can be improved by running a plurality of virtual machines in an ACT-SBY configuration.

CITATION LIST

Non Patent Literature

[NPL 1] Kawaguchi et al, "Evaluation on application of virtualization technology to SIP server", IEICE Technical Report, Vol. 117, No. 131, NS2017-70, pp. 211-216, July 2017

[NPL 2] Zhu et al., "Kasou kankyou ni okeru bubun backup to restore houshiki ni kansuru kentou (Study on Partial Backup and Restore Methods in a Virtual Environment)", The 2019 IEICE General Conference, Proceedings 2, B-6-19

[NPL 3] "Network kasouka (NFV)—Network kasouka no meritto—sono 2—(Network Functions Virtualization (NFV)—Advantages of Network Virtualization: Part 2)", [online], NTT DOCOMO, INC., Internet <URL: https://www.nttdocomo.co.jp/corporate/technology/rd/lecture/nfv/>

SUMMARY OF THE INVENTION

Technical Problem

Processing of an SIP message times out when a response is not obtained within a certain amount of time and a recall or an abnormal call occurs. For this reason, an SIP server is required to be real-time capable. In order to be real-time capable, a conventional SIP server running on dedicated hardware keeps, within the SIP server, a database storing information (location data) inside a switchboard such as a translator and a routing table which are necessary when providing a communication service.

When virtualizing an SIP server, a configuration is conceivable in which a database storing information with low update frequency and a large capacity such as location data is arranged outside of a virtual machine. The virtual machine transmits and receives messages to and from the externally-arranged database to access the database. However, since the SIP server is required to quickly access the database, separating the database from the SIP server (virtual machine) may prevent the SIP server from becoming real-time capable.

Real-time capability can be secured by including the database inside the virtual machine. However, if the database is included in the virtual machine, when upgrading software running on the virtual machine, the database must be copied to a virtual machine after the upgrade from a snapshot of the virtual machine prior to the upgrade. When starting up the virtual machine using an image of the virtual machine (also referred to as a VM image or an image file), the database must be copied to the VM image. Therefore, there is a problem in that upgrading software that runs on a virtual machine takes time. This problem is not limited to SIP servers and a similar problem exists in virtualization of an apparatus which is required to be real-time capable and which internally includes a database storing large-capacity information.

The present invention has been made in consideration of the above and an object thereof is to reduce time required to upgrade software that runs on a virtual machine.

Means for Solving the Problem

An updating method according to an aspect of the present invention is an updating method of updating software of a first virtual machine of an active system and a second virtual machine of a reserve system, the updating method including the steps of: stopping the second virtual machine; setting a link to a second database to be used by the second virtual machine to a second image file after a software update; starting up the second virtual machine using the second image file to which the link has been set and switching the second virtual machine to the active system; switching the first virtual machine to the reserve system and subsequently stopping the first virtual machine; setting a link to a first database to be used by the first virtual machine to a first image file after a software update; and starting up the first virtual machine using the first image file to which the link has been set.

An updating apparatus according to another aspect of the present invention is an updating apparatus that updates software of a first virtual machine of an active system and a second virtual machine of a reserve system, the updating apparatus including: a control unit that controls the first virtual machine and the second virtual machine; and a setting unit that sets a first image file to be used to start up the first virtual machine and a second image file to be used to start up the second virtual machine, wherein the control unit stops the second virtual machine, the setting unit sets a link to a second database to be used by the second virtual machine to the second image file after a software update, the control unit starts up the second virtual machine using the second image file to which the link has been set and switches the second virtual machine to the active system, the control unit switches the first virtual machine to the reserve system and subsequently stops the first virtual machine, the setting unit sets a link to a first database to be used by the first virtual machine to the first image file after a software update, and the control unit starts up the first virtual machine using the first image file to which the link has been set.

Effects of the Invention

According to the present invention, time required to upgrade software that runs on a virtual machine can be reduced.

DESCRIPTION OF EMBODIMENT

Figure 1:
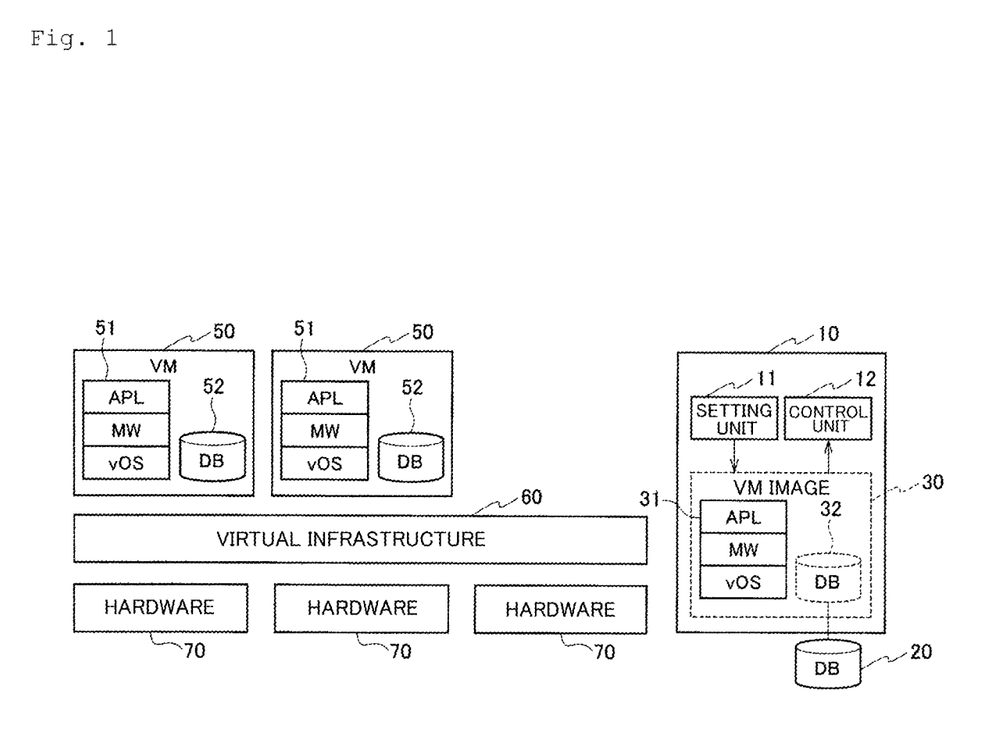
FIG. 1 is a diagram showing an example of a virtual environment including an updating apparatus according to a present embodiment.

A virtual environment including a virtualization management system 10 (an updating apparatus) according to a present embodiment will be described with reference to FIG. 1. The virtual environment shown in FIG. 1 is an abstraction of resources provided by hardware 70 and runs a virtual machine 50 on a virtual infrastructure 60. Software 51 including a virtual OS (vOS), middleware (MW), and an application (APL) are installed on the virtual machine 50. The virtual machine 50 internally includes a database (DB) 52.

The virtualization management system 10 manages the virtual machine 50. For example, the virtualization management system 10 starts up the virtual machine 50 using a VM image 30 including necessary software 31 and a DB 32 and stops the running virtual machine 50.

The VM image 30 is stored in a storage provided in the virtualization management system 10 or in an external storage. Using the VM image 30 enables the virtual machine 50 to be started up in a state where the software 51 has been installed. The virtualization management system 10 expands the VM image 30 in a memory on the virtual infrastructure 60 and starts up the virtual machine 50. It should be noted that all of the pieces of software including the vOS, the MW, and the APL need not be installed in the VM image 30. Necessary software may be installed in the virtual machine 50 after starting up the virtual machine 50.

In the present embodiment, a DB 20 is arranged outside the VM image 30 and a link to the DB 20 is set as the DB 32 included in the VM image 30. A link refers to information indicating an entity of the DB 20. Accessing the link enables the entity of the DB 20 that is a destination of the link to be accessed. When the virtual machine 50 is started up using the VM image 30 to which a link to the DB 20 is set, the virtual machine 50 is started up in a state where a link to the DB 20 has been set as the DB 52 or, in other words, the virtual machine 50 is started up in a state where the DB 20 is referable. For example, when starting up the virtual machine 50 using the VM image 30 to which a link to the DB 20 is set, the virtualization management system 10 mounts (also referred to as "attaches") a volume in which the DB 20 that is the link destination exists to the virtual machine 50. Accordingly, when updating the software 51 of the virtual machine 50, contents of a database of the running virtual machine need not be copied to a database of the new VM image. Alternatively, when starting up the virtual machine 50 using the VM image 30 to which a link to the DB 20 is set, the virtualization management system 10 may copy the contents of the DB 20 to the DB 52 of the virtual machine 50. The DB 52 of the virtual machine 50 exists on a memory or a storage allocated to the virtual machine 50. Even in this case, contents of the database of the running virtual machine need not be copied to the database of the new VM image.

For example, the DB 20 may be retained by an apparatus that provides the virtual machine 50 with a volume (a block storage device) or by an apparatus managed by the virtualization management system 10 (an apparatus in a virtual environment). The DB 20 stores data which has a large size and which is required to be real-time capable. For example, when the virtual machine 50 is to be run as an SIP server, the location data described earlier is to be stored in the DB 20.

Next, a configuration of the virtualization management system 10 according to the present embodiment will be described.

The virtualization management system 10 shown in FIG. 1 includes a setting unit 11 and a control unit 12.

The setting unit 11 generates the VM image 30 in which updated software 31 including a vOS, MW, and an APL has been installed and sets a link to the DB 20 to the VM image 30.

The control unit 12 starts up the virtual machine 50 using the VM image 30 and stops the running virtual machine 50. In addition, when starting up the virtual machine 50, the control unit 12 mounts the DB 20 linked to the VM image 30 to the virtual machine 50 or copies contents of the DB 20 to the DB 52 of the virtual machine 50.

Figure 2:
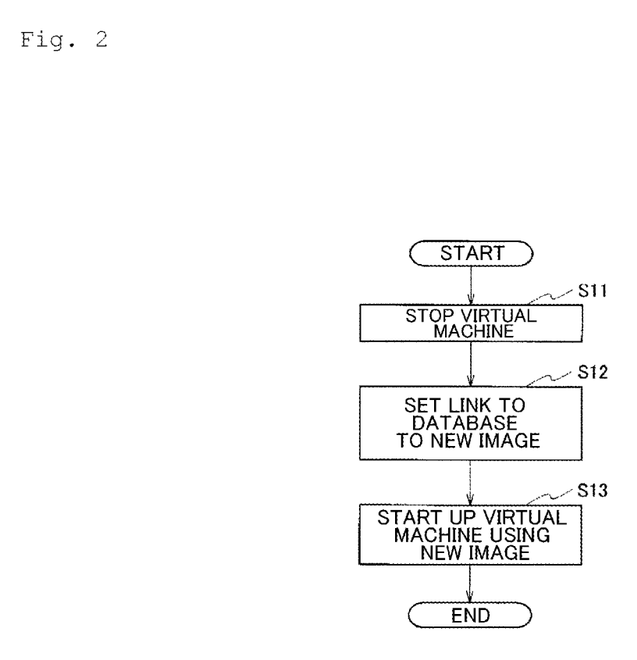
FIG. 2 is a flow chart showing a flow of software update processing.

Next, a flow of software update processing by the virtualization management system 10 according to the present embodiment will be described with reference to FIGS. 2 to 4. FIG. 2 is a flow chart showing a flow of the software update processing.

Figure 3:
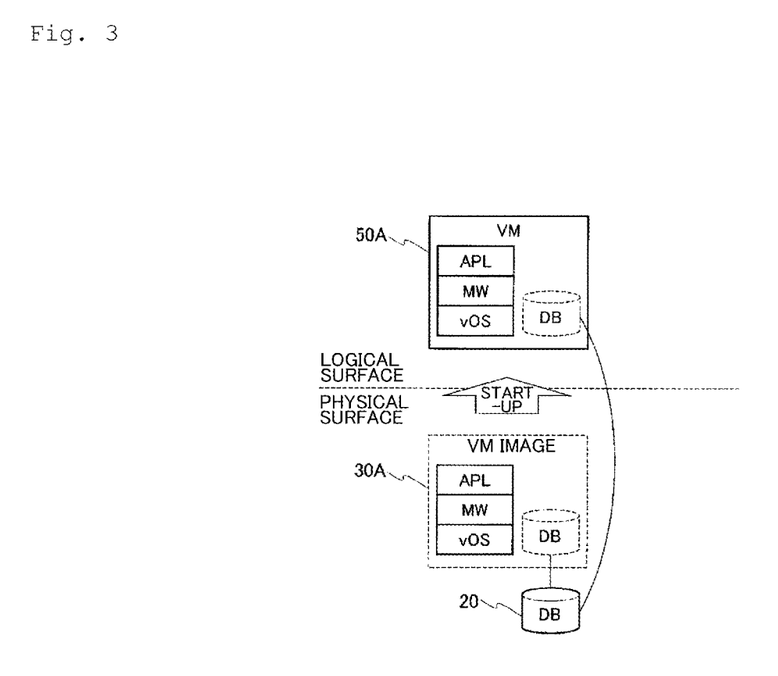
FIG. 3 is a diagram showing a situation where a virtual machine has been started up using a VM image to which a database has been linked.
Figure 4:
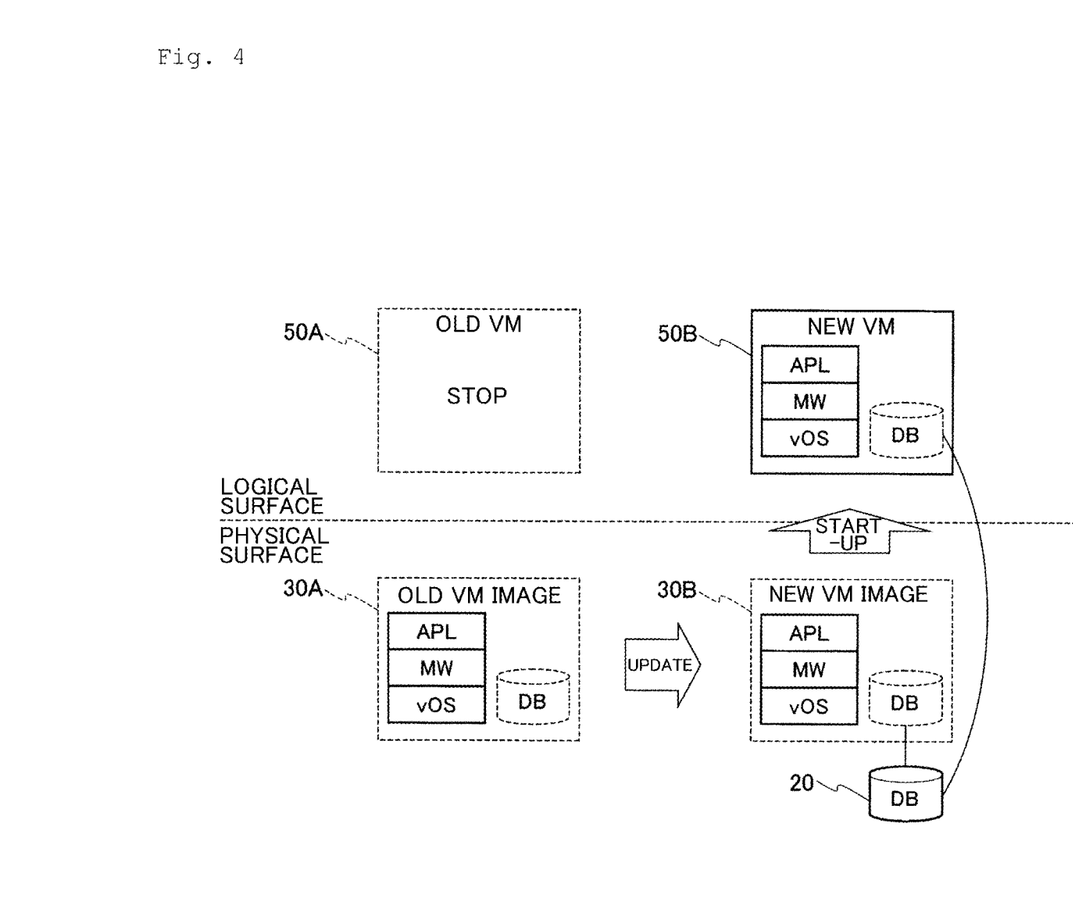
FIG. 4 is a diagram for explaining a virtual machine after updating software.

As shown in FIG. 3, it is assumed that a virtual machine 50A started up using an old VM image 30A is running. The virtual machine 50A is linked to the DB 20. In FIG. 3, a surface of a virtual infrastructure on which the virtual machine runs is shown as a logical surface and a storage in which the VM image is stored is shown as a physical surface. The virtual machine runs by loading the VM image stored on the physical surface (for example, a disk) onto the logical surface (for example, a memory).

In step S11, the control unit 12 stops the virtual machine 50A that is a software update target. Accordingly, update of the DB 20 is also stopped.

In step S12, the setting unit 11 sets a link to the DB 20 to a new VM image 30B in which updated software has been installed. The new VM image 30B not including a database can be prepared in advance before stopping the virtual machine 50A.

In step S13, the control unit 12 starts up a virtual machine 50B using the new VM image 30B. When starting up the virtual machine 50B, the control unit 12 mounts the DB 20 to which the new VM image 30B is linked to the virtual machine 50B.

According to the processing described above, as shown in FIG. 4, the virtual machine 50B of which software has been updated runs.

When copying the contents of the DB 20 to the memory of the virtual machine 50 instead of mounting the DB 20 to the virtual machine 50B upon starting up the virtual machine 50B, while the virtual machine 50A is running and upon stopping the virtual machine 50A in step S11, the database of the virtual machine 50A and the DB 20 are synchronized with each other.

As described above, in the updating method according to the present embodiment, a link to the DB 20 to be used by the virtual machine 50A is set to the new VM image 30B and the virtual machine 50B is started up using the new VM image 30B. Accordingly, since there is no longer a need to copy the DB 20 to the VM image 30B after stopping the virtual machine 50A, the time required to upgrade software can be reduced.

Figure 5:
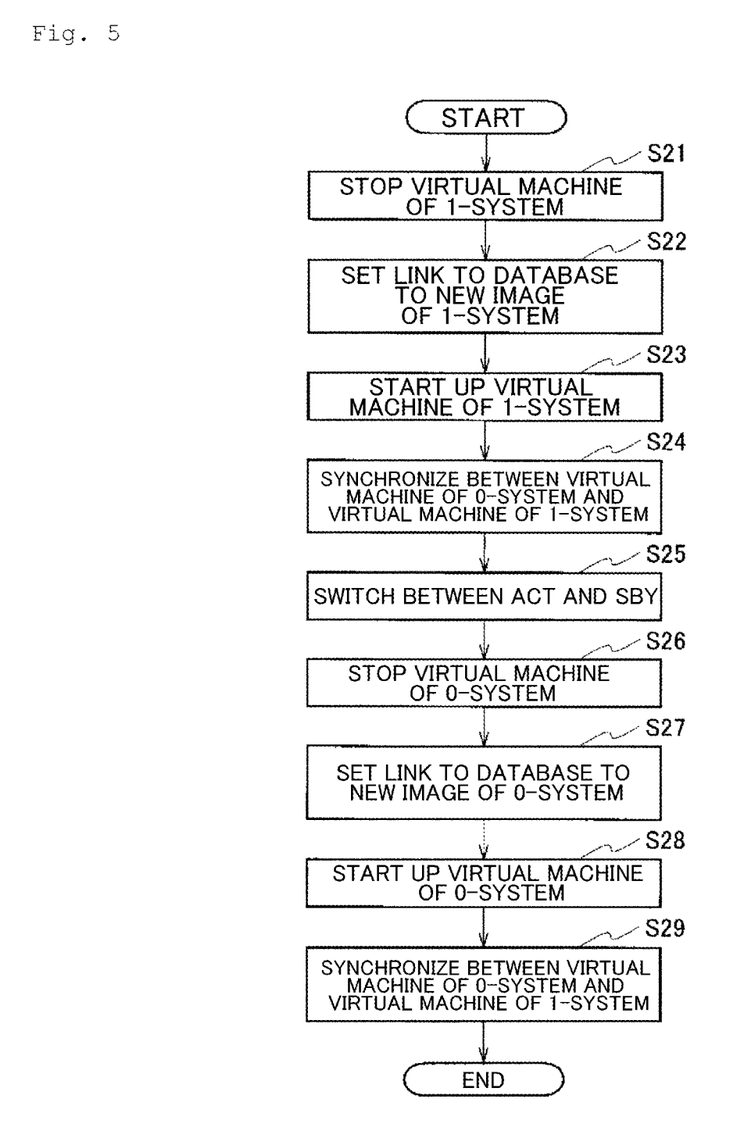
FIG. 5 is a flow chart showing a flow of processing for updating software of virtual machines that run in an ACT-SBY configuration.

Next, processing for updating software of virtual machines that run in an ACT-SBY configuration will be described with reference to FIGS. 5 to 11. For example, virtual machines that run as SIP servers are duplexed to run in an ACT-SBY configuration. FIG. 5 is a flow chart showing a flow of processing for updating software of virtual machines that run in an ACT-SBY configuration.

Figure 6:
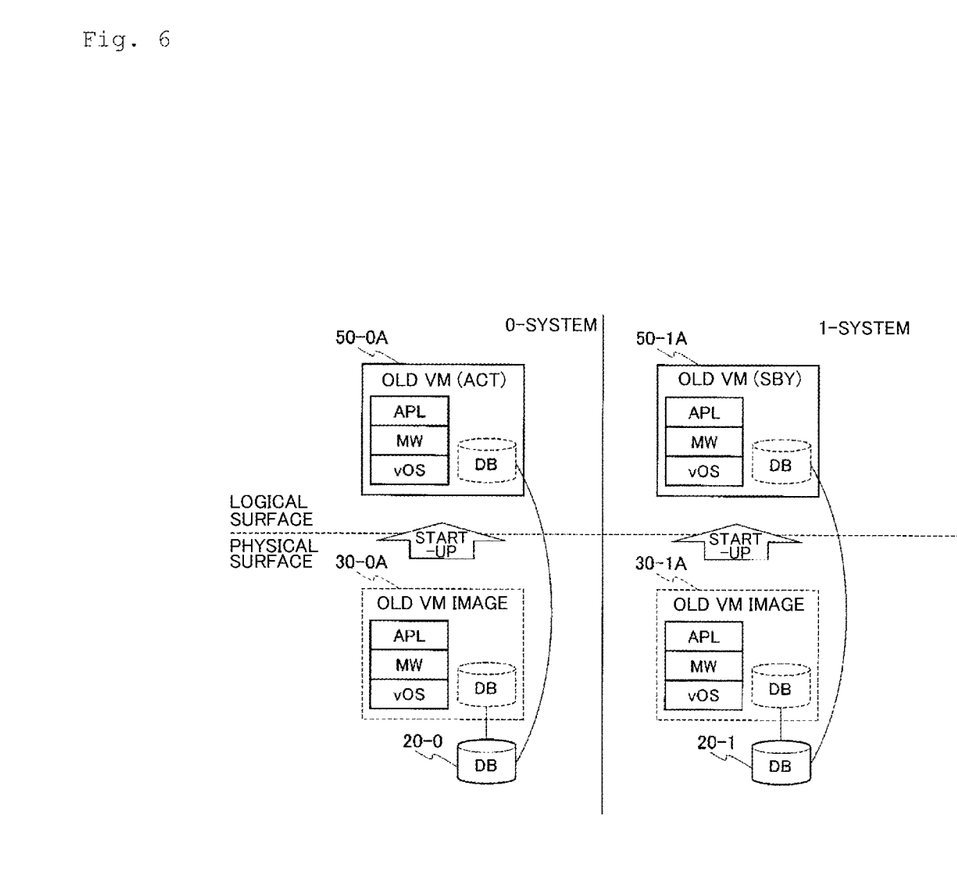
FIG. 6 is a diagram showing a situation where a virtual machine of a 0-system and a virtual machine of a 1-system have been started up.

As shown in FIG. 6, a virtual machine 50-0A of a 0-system and a virtual machine 50-1A of a 1-system are started up in a virtual environment. Specifically, in the 0-system, the virtual machine 50-0A is started up from a VM image 30-0A to which a DB 20-0 has been linked. The virtual machine 50-0A is mounted with the DB 20-0. In the 1-system, the virtual machine 50-1A is started up from a VM image 30-1A to which a DB 20-1 has been linked. The virtual machine 50-1A is mounted with the DB 20-1. The 0-system is assumed to be ACT and the 1-system is assumed to be SBY. Since the virtual machine 50-0A and the virtual machine 50-1A that run in an ACT-SBY configuration are synchronized with each other, the DB 20-0 and the DB 20-1 are also synchronized with each other. Normally, the virtual machine 50-0A runs and the virtual machine 50-1A is on standby. When a failure occurs in the virtual machine 50-0A, the virtual machine 50-1A runs and takes over processing. Hereinafter, processing for updating software will be described. The following processing may be performed by the virtualization management system 10 or by an entire virtual environment.

In step S21, the virtual machine 50-1A of the 1-system is stopped. Accordingly, update of the DB 20-1 is also stopped.

Figure 7:
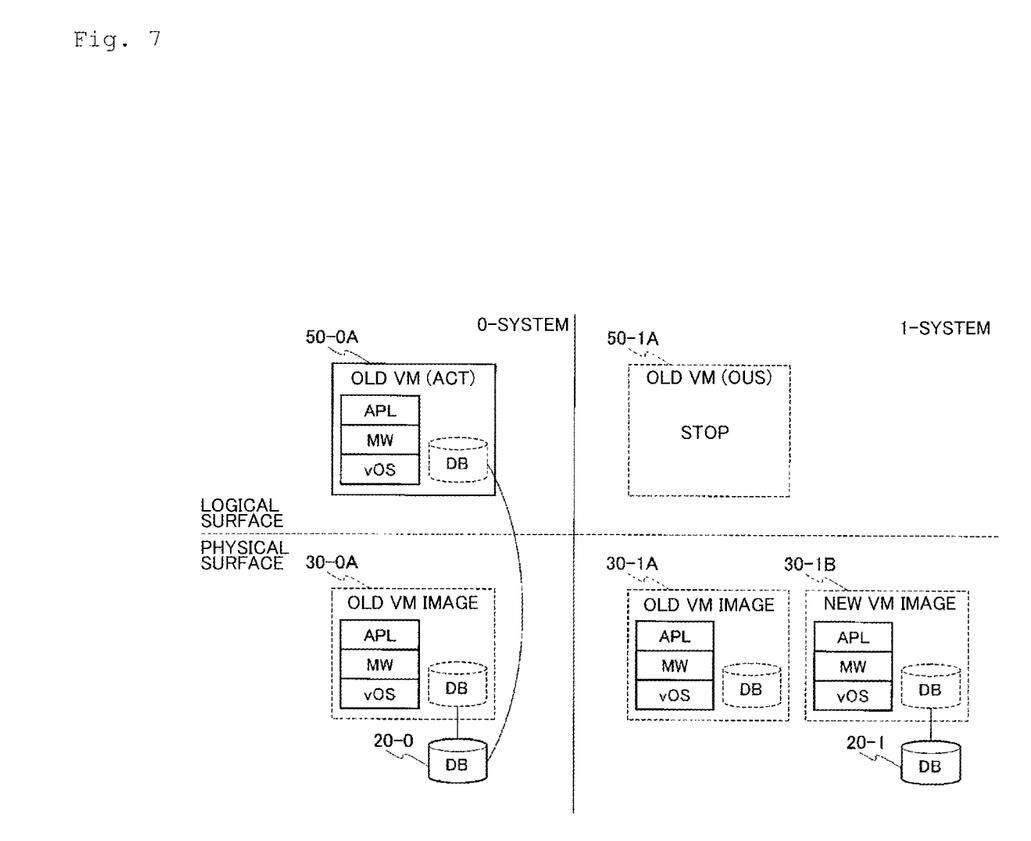
FIG. 7 is a diagram showing a situation where a database has been linked to a VM image for starting up a virtual machine of the 1-system.

In step S22, as shown in FIG. 7, a link to the DB 20-1 is set to a new VM image 30-1B in which updated software has been installed. It should be noted that the virtual machine 50-0A is running as ACT.

In step S23, a virtual machine 50-1B is started up using the new VM image 30-1B. Upon startup of the virtual machine 50-1B, the DB 20-1 is mounted to the virtual machine 50-1B.

Figure 8:
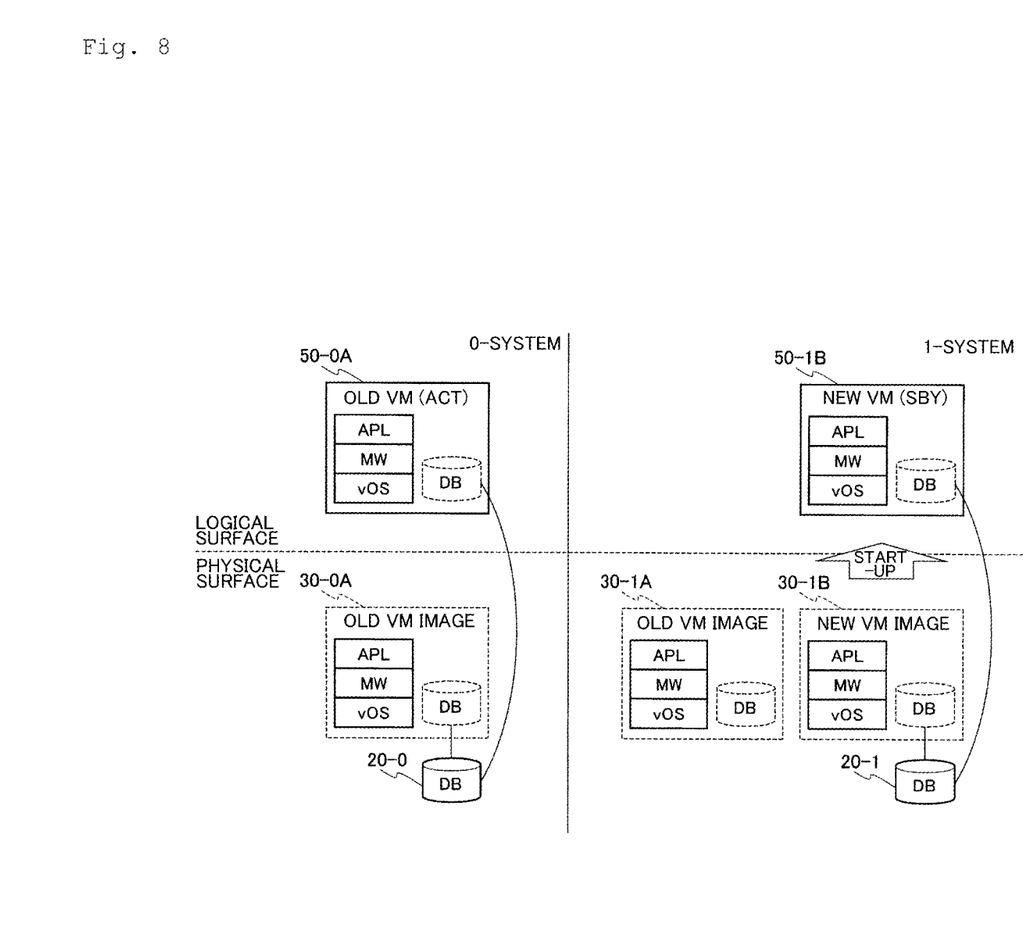
FIG. 8 is a diagram showing a situation where a virtual machine of the 1-system has been started up using a VM image to which a database has been linked.

According to the processing of steps S21 to S23, as shown in FIG. 8, the virtual machine 50-1B of which software has been updated runs.

In step S24, when the DB 20-0 of the 0-system has been updated during the update of the virtual machine of the 1-system, the virtual machine 50-0A and the virtual machine 50-1B are synchronized with each other and the DB 20-0 and the DB 20-1 are synchronized with each other.

Figure 9:
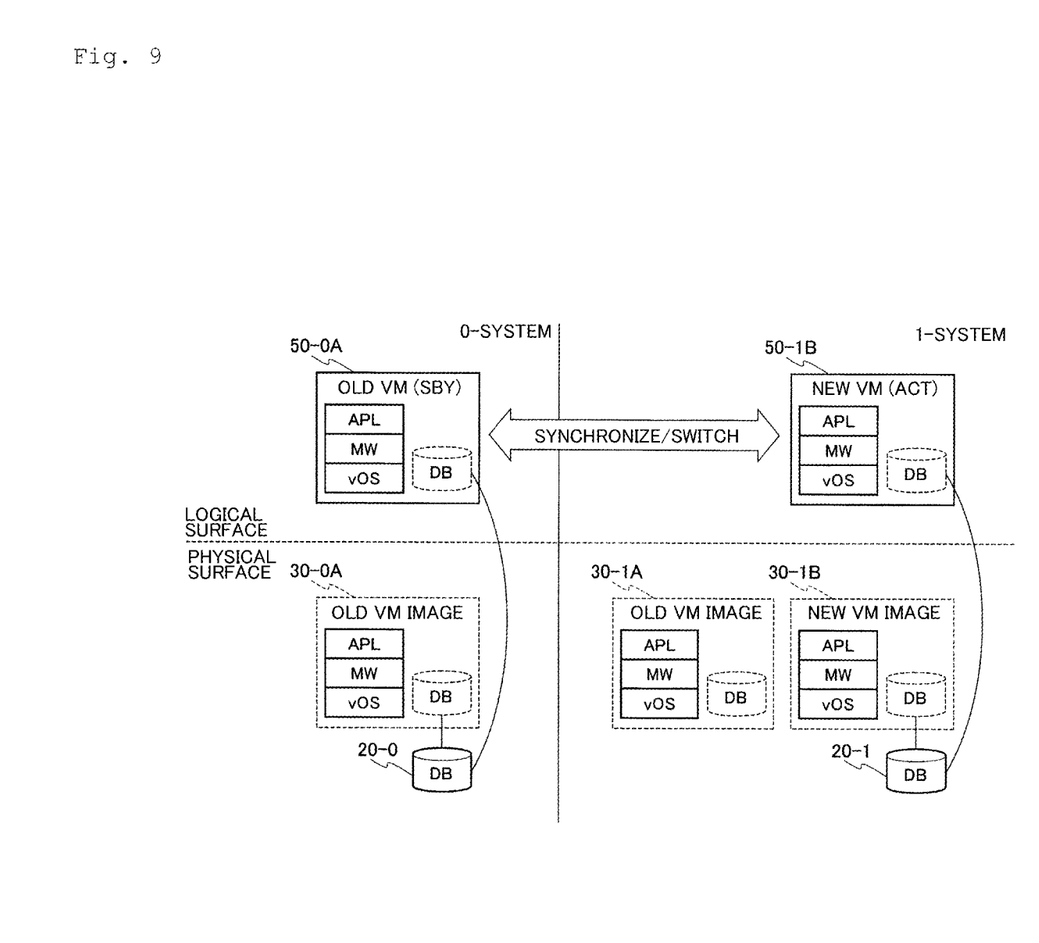
FIG. 9 is a diagram showing a situation where switching is performed between an active system and a reserve system.

In step S25, switching of systems is performed and the 0-system becomes SBY and the 1-system becomes ACT as shown in FIG. 9. After switching systems, the virtual machine 50-1B runs as ACT.

In step S26, the virtual machine 50-0A of the 0-system is stopped. Accordingly, update of the DB 20-0 is also stopped.

Figure 10:
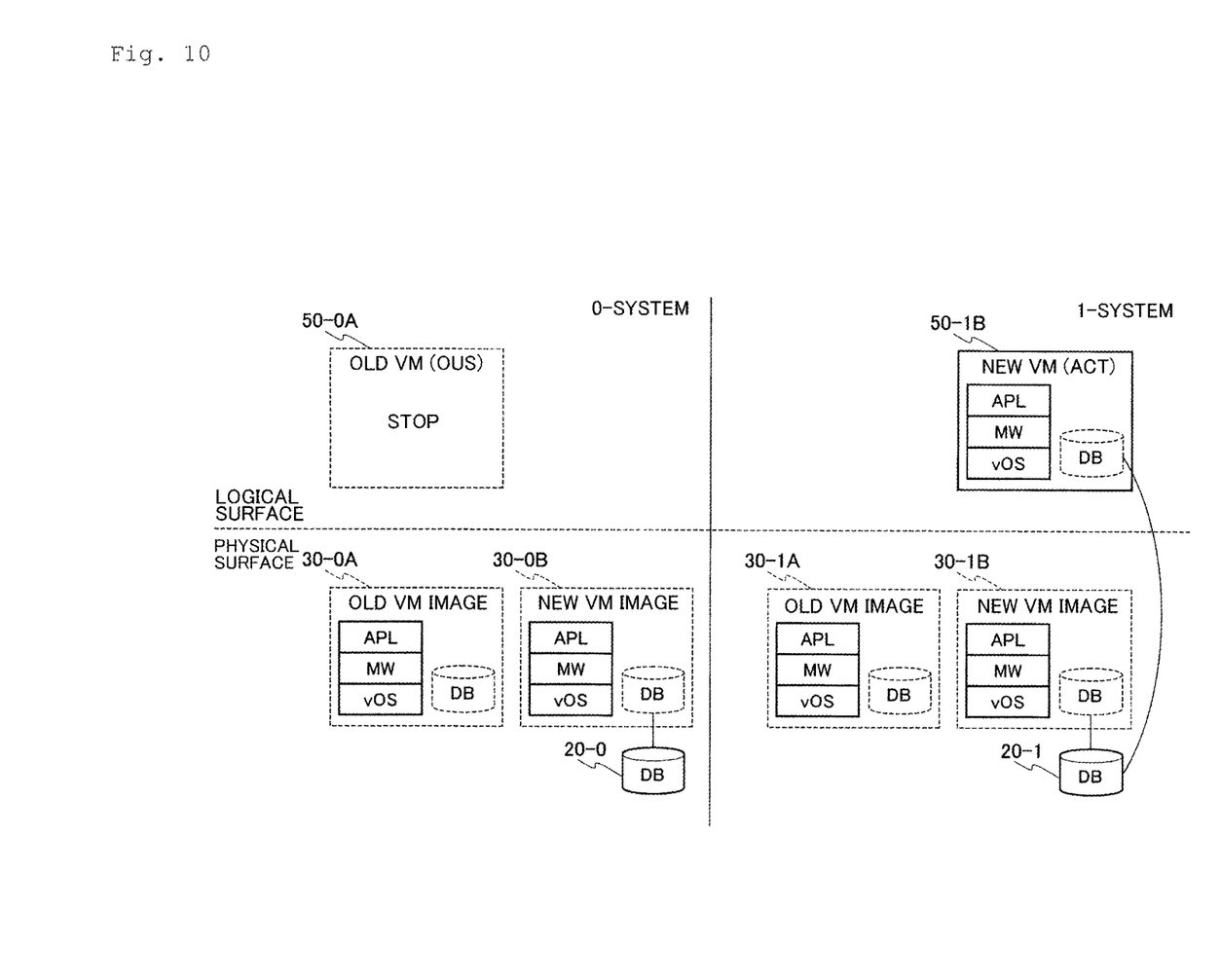
FIG. 10 is a diagram showing a situation where a database has been linked to a VM image for starting up a virtual machine of the 0-system.

In step S27, as shown in FIG. 10, a link to the DB 20-0 is set to a new VM image 30-0B in which updated software has been installed.

In step S28, a virtual machine 50-0B is started up using the new VM image 30-0B. Upon startup of the virtual machine 50-0B, the DB 20-0 is mounted to the virtual machine 50-0B.

Figure 11:
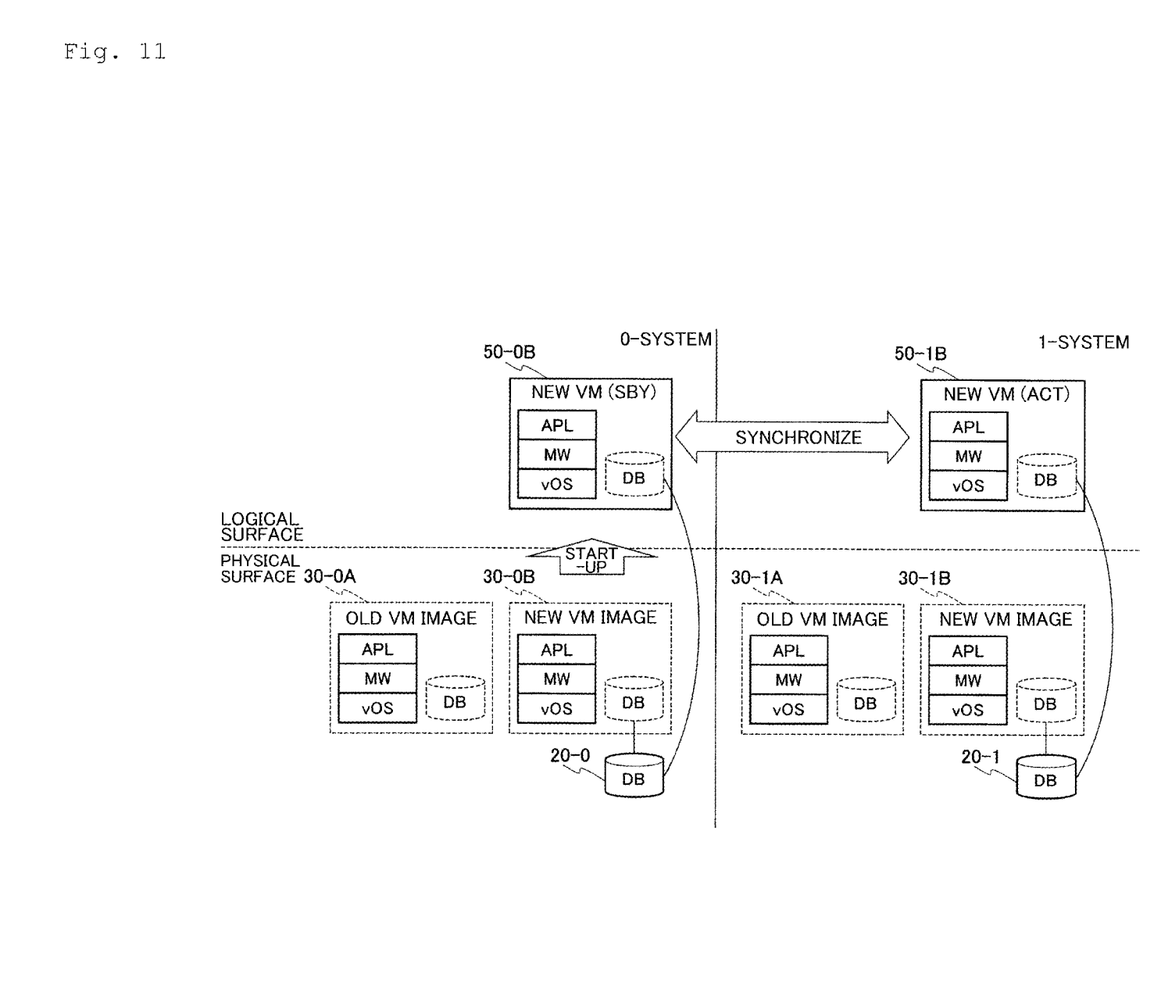
FIG. 11 is a diagram showing a situation where a virtual machine of the 0-system has been started up using a VM image to which a database has been linked.

According to the processing of steps S26 to S28, as shown in FIG. 11, the virtual machine 50-1B of which software has been updated runs.

In step S29, the virtual machine 50-0B and the virtual machine 50-1B are synchronized with each other. After the synchronization, the virtual machines run in an ACT-SBY configuration.

As described above, in the updating method according to the present embodiment, when upgrading software of the virtual machines 50-0A and 50-1A that run in an ACT-SBY configuration, the virtual machine 50-1A is stopped, the virtual machine 50-1B is started up using the new VM image 30-1B to which a link to the DB 20-1 is set, and the virtual machine 50-1B is switched to an active system. The virtual machine 50-0A is stopped and the virtual machine 50-0B is started up using the new VM image 30-0B to which a link to the DB 20-0 is set. Accordingly, since information stored in the DBs 20-0 and 20-1 need no longer be copied and the time required to upgrade software of the virtual machines 50-0A and 50-1A of ACT and SBY can be reduced, a period of one-system operation can be reduced and a decline in reliability can be mitigated.

Figure 12:
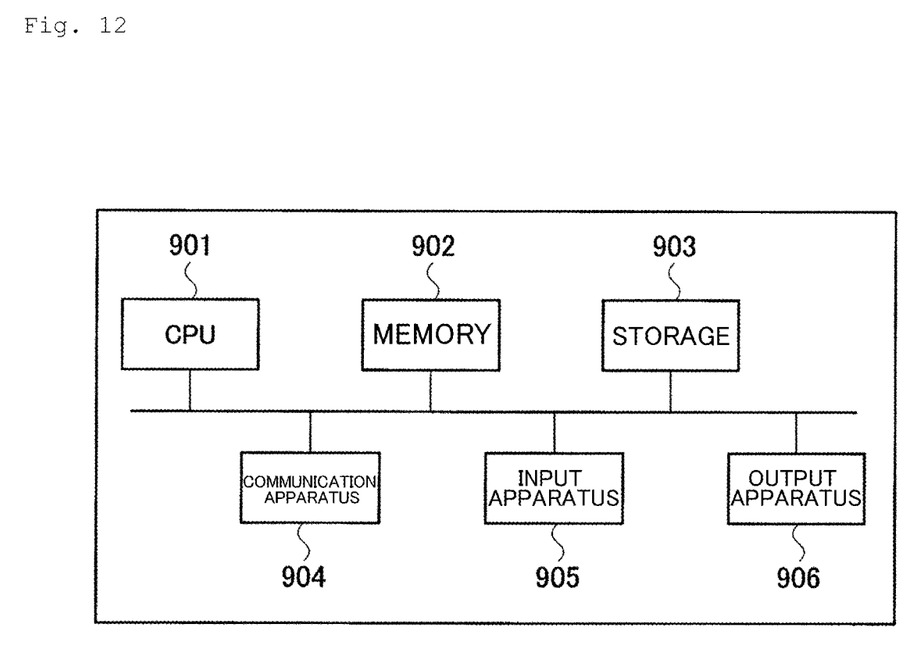
FIG. 12 is a diagram showing an example of a hardware configuration of an updating apparatus.

As the updating apparatus described above, for example, as shown in FIG. 12, a general-purpose computer system including a central processing unit (CPU) 901, a memory 902, a storage 903, a communication apparatus 904, an input apparatus 905, and an output apparatus 906 can be used. In the computer system, an updating apparatus is realized when the CPU 901 executes a predetermined program loaded onto the memory 902. The program can be recorded on a computer-readable recording medium such as a magnetic disk, an optical disk, or a semiconductor memory and can also be distributed via a network.

REFERENCE SIGNS LIST

10 Virtualization management system
11 Setting unit

12 Control unit
20, 20-0, 20-1 Database
30, 30A, 30B, 30-0A, 30-0B, 30-1A, 30-1B VM image
50, 50A, 50B, 50-0A, 50-0B, 50-1A, 50-1B Virtual machine
60 Virtual infrastructure
70 Hardware

The invention claimed is:

1. An updating method of updating software of a first virtual machine of an active system and a second virtual machine of a reserve system, the updating method comprising:
generating a second new image file where updated software has been installed, wherein the second new image file does not include at least one database that is to be used by the second virtual machine;
stopping the second virtual machine;
setting a second link between the second new image file to a second outside database including data to be used by the second virtual machine;
starting up a second new virtual machine using the second new image file to which the second link has been set;
mounting the second outside database to the second new virtual machine and switching the second new virtual machine to the active system;
switching the first virtual machine to the reserve system and subsequently stopping the first virtual machine;
generating a first new image file where the updated software has been installed, wherein the first new image file does not include at least one database that is to be used by the first virtual machine;
setting a first link between the first new image file to a first outside database including data to be used by the first virtual machine;
starting up a first new virtual machine using the first new image file to which the first link has been set; and
mounting the first outside database to the first new virtual machine.

2. An updating apparatus that updates software of a virtual machine, the updating apparatus comprising one or more processors configured to perform operations comprising:
determining that a virtual machine is a software update target;
generating a new image file where updated software has been installed, wherein the new image file does not include at least one database that is to be used by the virtual machine;
stopping the virtual machine that is the software update target;
setting a link between the new image file and an outside database including data to be used by the virtual machine;
starting up a new virtual machine using the new image file; and
mounting the outside database to the new virtual machine.

3. An updating apparatus that updates software of a first virtual machine of an active system and a second virtual machine of a reserve system, the updating apparatus comprising one or more processors configured to perform operations comprising:
generating a second new image file where updated software has been installed, wherein the second new image file does not include at least one database that is to be used by the second virtual machine;
stopping he second virtual machine,
setting a second link between the second new image file to a second outside database including data to be used by the second virtual machine;
starting up a second new virtual machine using the second new image file to which the second link has been set;
mounting the second outside database to the second new virtual machine and switching the second new virtual machine to the active system;
switching the first virtual machine to the reserve system and subsequently stops the first virtual machine;
generating a first new image file where the updated software has been installed, wherein the first new image file does not include at least one database that is to be used by the first virtual machine;
setting a first link between the first new image file to a first outside database including data to be used by the first virtual machine; and
starting up a first new virtual machine using the first new image file to which the first link has been set; and
mounting the first outside database to the first new virtual machine.

4. A non-transitory computer-readable medium storing one or more instructions that cause a computer to execute the updating method according to claim 1.

* * * * *